United States Patent
Kou

(10) Patent No.: US 6,647,447 B1
(45) Date of Patent: Nov. 11, 2003

(54) ALLOCATING ISOCHRONOUS CHANNEL NUMBERS TO DEVICES ON AN IEEE-1394 BUS

(75) Inventor: Sho Kou, Saratoga, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 448 days.

(21) Appl. No.: 09/752,076

(22) Filed: Dec. 29, 2000

(51) Int. Cl.$^7$ .............................................. G06F 13/00
(52) U.S. Cl. ..................... 710/100; 709/226; 370/431
(58) Field of Search ................... 710/18, 100; 725/98, 725/109, 148; 709/104, 226; 370/431, 437, 463, 489, 341

(56) References Cited

U.S. PATENT DOCUMENTS

| | | | | |
|---|---|---|---|---|
| 5,535,208 A | * | 7/1996 | Kawakami et al. | 370/391 |
| 5,815,678 A | * | 9/1998 | Hoffman et al. | 710/305 |
| 5,991,520 A | * | 11/1999 | Smyers et al. | 710/100 |
| 6,003,041 A | * | 12/1999 | Wugofski | 707/104.1 |
| 6,130,758 A | * | 10/2000 | Funazaki | 358/1.15 |
| 6,167,471 A | * | 12/2000 | Liu et al. | 710/62 |
| 6,286,071 B1 | * | 9/2001 | Iijima | 710/124 |
| 6,321,382 B1 | * | 11/2001 | Wugofski | 725/59 |
| 6,408,355 B1 | * | 6/2002 | Toguchi | 710/314 |
| 6,523,064 B1 | * | 2/2003 | Akatsu et al. | 709/226 |

FOREIGN PATENT DOCUMENTS

| | | | | |
|---|---|---|---|---|
| EP | 0803819 A2 | * | 10/1997 | G06F/13/12 |
| EP | 0940946 A1 | * | 3/1999 | H04L/12/18 |
| GB | 2344497 A | * | 6/2000 | H04L/12/40 |
| JP | 2000261455 A | * | 9/2000 | G06F/13/38 |

OTHER PUBLICATIONS

IEEE Standard for a High Performance Serial Bus, IEEE Std 1394–1995, IEEE Inc., 1996.*

* cited by examiner

*Primary Examiner*—Xuan M. Thai

(57) ABSTRACT

The isochronous channel number to be used in transferring an isochronous data stream over a bus from a source device to a destination device can be selected via a simple and straightforward method or a low cost apparatus. The device identifier of the source device is obtained. A device identifier suitable in some embodiments of the invention is the node identifier of the source device within an IEEE-1394, IEEE-1394a or an IEEE-1394.B bus. If the source device is not currently outputting another isochronous stream over the bus, then an isochronous channel number that corresponds to (for example, equals) the source device identifier can be used. In some embodiments, each device is entitled to use an isochronous channel number equal to its physical ID and thus need not check to see if that channel is otherwise in use. When multiple isochronous channels are to be output from the same device, then some embodiments use the device identifier of a device to which the isochronous stream is to be transmitted, when the isochronous channel of that number is available. Some embodiments use the highest available channel number below the isochronous channel reserved for broadcasting. Some embodiments listen on the bus for isochronous transmissions to determine that a particular isochronous channel is not currently in use. Some embodiments of the invention are advantageous for situations where the bus is a simple one that does not have an isochronous resource manager.

24 Claims, 3 Drawing Sheets

US 6,647,447 B1

ALLOCATING ISOCHRONOUS CHANNEL NUMBERS TO DEVICES ON AN IEEE-1394 BUS

FIELD OF THE INVENTION

The invention relates to isochronous buses. In particular, it relates to methods and apparatuses for allocating the limited number of isochronous channel numbers available on such busses among the devices on the bus that provide isochronous data streams.

BACKGROUND OF THE INVENTION

Isochronous buses and networks are able to transmit isochronous data packets within particular time slots. Isochronous buses include but are not limited to Apple Computer's FireWire (R) bus or Sony's i.LINK (R) bus. These are also known as IEEE-1394, IEEE-1394a or IEEE-1394.B buses; the Institute for Electrical and Electronic Engineers (IEEE) has adopted, or is in the process of adopting, uniform standards for these buses so that devices from different manufactures can communicate.

The ability these buses have to send information isochronously is particularly important for audio data or video data to be presented to a user via a visual display or an audio output device such as speakers. When transmitted isochronously, the audio/video data is handled in a manner that attempts to guarantee that the data arrives on time at the device that will be reproducing or presenting it to the user. On time delivery of each isochronous packet within its particular time slot eliminates or reduces visual and audio glitches, pops and dead spots, which are often result when digital audio/video data is late or missing.

Further, if a problem does occasionally occur and there is a momentary problem, then the presentation should quickly be back to normal. This is because the next isochronous audio/video data packet is transmitted in its appropriate time slot regardless of what may have happened in prior time slots.

Electronic devices, such as camcorders and video game playing devices, are currently being marketed that will allow homes and offices connect a number of different types of source and destination devices, all of which can then share isochronous audio/video data. The user can mix and match a wide variety of program or entertainment sources with television sets, stereos and other presentation devices throughout a home or office. Sources of isochronous audio/video data include, but are not limited to, video cassette recorders (VCRs), digital video disk (DVD) players, and cable, satellite or terrestrial broadcast receivers.

Needless to say, getting such a wide variety of devices to successfully communicate with each other presents a substantial challenge, particularly if it is to be done in a manner that is easy for a consumer to use and to initially set up. He or she should not be forced to master esoteric details of how networked audio/video devices operate individually, nor how they inter-operate when connected together.

One example of this challenge is to assign isochronous channel numbers. Each packet of isochronous data is tagged with a channel number. Like the channel number used in broadcast television, any device on the network that wishes to reproduce that particular stream of isochronous audio/video data simply accepts and processes those isochronous packets that are tagged with the corresponding channel number.

For example, isochronous channel 13 could contain the movie *Gone with The Wind*, which a housewife is having shown both on the home theater in her den and on the small television set in her kitchen. Thus, she need not stop the movie whenever she has to go and check on dinner. At the same time, isochronous channel number 1 could contain the broadcast sporting event that travels over the same bus from the rooftop satellite receiver to the bedroom television set that her husband is watching.

Unlike the channel numbers of television, isochronous channel numbers are very dynamic. Isochronous channel 3 does not consistently mean the XYZ broadcast network, or the local radio station. Whenever any user of the home network starts playback of music, tunes into a broadcast television show, etc. the use of another isochronous channel is initiated. Once a channel is discontinued, then there is no more meaning associated with that channel number; that channel number is available for the next show, movie, game or other entertainment or educational activity.

Nevertheless, isochronous channel numbers can not be assigned willy nilly. Each isochronous channel must have a number that is unique among those currently active. Otherwise, two or more audio/video streams can be intermixed.

The bus structures specified by the IEEE allow one of the devices on the bus to manage this process by becoming the isochronous resource manager. For each of the 64 isochronous channels allowed within a single bus, the isochronous resource manager maintains a flag that indicates whether or not that particular channel number is in use. A device that is about to initiate a new isochronous channel can access these flags, locate an un-flagged and thus unused channel and set that flag, thus claiming that channel number for itself.

One goal of the design of these buses is that there need not be a central device, such as a personal computer, that monitors and controls the bus activity. Another goal is to minimize the cost of devices that attach to such buses. Thus, the specifications do not require that there be an isochronous resource manager device on each bus. If there is no isochronous resource manager on the bus, then the IEEE specifications do not provide a way for a device to determine what isochronous channels are currently active so as to select an unused one for a new audio/video stream.

An example device that can be coupled to other devices via an isochronous bus is a digital video camera recorder (DV camcorder). A DV camcorder can be connected via an isochronous bus to a variety of display devices, for example to a large screen television so that the family could watch what Dad is recording as he captures daughter Susie's first steps.

However, DV camcorders are being marketed that make no attempt to select an available isochronous stream number. Rather, then simply output the isochronous audio/video stream that they are recording on the highest numbered isochronous stream, which according to the IEEE specifications is reserved for broadcast isochronous streams that are to be received and displayed or processed by every device on the bus.

This creates two problems. First, it is impossible to simultaneously operate two such DV camcorders on the same bus because their use of the same isochronous channel number would conflict. Second, it forces all devices attached to the bus to listen to the audio/video stream that such DV camcorders are sending on the broadcast isochronous channel. If, for example, son Johnny is using the DV camcorder for a school project, then Mom's and Dad's televisions may show the broadcast channel, regardless of whether or not they wanted to watch his work as it progresses.

SUMMARY OF THE INVENTION

Thus there is a need for a simple, straightforward and low cost method and apparatus to select the isochronous channel number used in transferring an isochronous data stream over a bus from a source device to a destination device. This is particularly needed for buses that do not have an isochronous resource manager.

According to this invention, the device identifier of the source device is obtained. A device identifier suitable in some embodiments of the invention is the physical identifier within the node identifier of the source device within an IEEE-1394, IEEE-1394a or an IEEE-1394.B bus. If the source device is not currently outputting another isochronous stream over the bus, then an isochronous channel number that corresponds to the source device identifier can be used. In some embodiments, each device is entitled to use an isochronous channel number equal to its device identifier and thus need not check to see if that channel is otherwise in use.

When multiple isochronous channels are to be output from the same device, then some embodiments use the device identifier of a device to which the isochronous stream is to be transmitted, when the isochronous channel of that number is available. Some embodiments use the highest available channel number below the isochronous channel reserved for broadcasting. Some embodiments listen on the bus for isochronous transmissions to determine that a particular isochronous channel is not currently in use.

BRIEF DESCRIPTION OF THE DRAWINGS

The invention is illustrated in the following drawings, in which known circuits and other elements are shown in block form for clarity. These drawings are for explanation and for aiding the reader's understanding; the invention should not be taken as being limited to the embodiments and alternatives illustrated.

DETAILED DESCRIPTION OF THE INVENTION

Disclosed herein are various alternative embodiments of, and alternative designs for, the invention. The invention, however, should not be taken as being limited to the embodiments and alternatives described. One skilled in the art will recognize various alternative embodiments and changes in form and detail that may be employed while practicing the invention without departing from its principles, spirit or scope.

Figure 1:
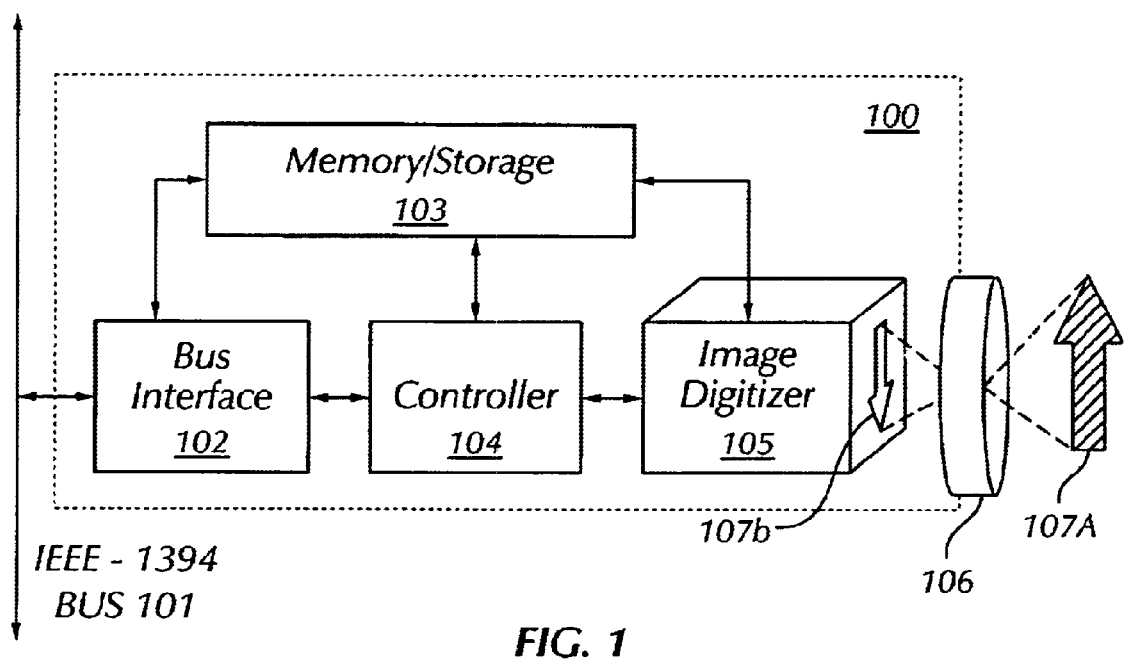
FIG. 1 shows the major components of a digital video camera recorder (DV camcorder) 100, which can include an embodiment of this invention.

FIG. 1 shows the major components of DV camcorder 100. Optics 106 create a focused image 107b of object 107a on image digitizer 105. This image is digitized and stored in memory/storage 103. Memory/storage 103 typically has both temporary storage for currently active data and a removable recording media, including but not limited to an 8 millimeter tape cartridge, a mini-disk, or a memory stick.

Bus interface 102 can send over isochronous bus 101 the video information being digitized or being played back from memory/storage 103. It is also desirable that the user be able to record on memory/storage 103 digital video information that is provided via bus 101 and bus interface 102. While bus 101 may be part of a complex home digital entertainment network, this is not needed for the proper operation of camcorder 100. Thus, it may not be cost effective for bus interface 102 to be complex or complete; for example, it may not include the extra circuitry and memory required to become the isochronous resource manager (IRM) of bus 101.

There is an additional cost involved in making an isochronous device capable of being the IRM. Both the CHANNELS_AVAILABLE register and the BANDWIDTH_AVAILABLE register must be supported. In addition to the register themselves, an IRM must support the read and locking update mechanisms defined for these registers to preclude two devices from simultaneously making conflicting updates to them. An IRM must have another register that holds the ID of the bus manager. The device must have its link and transaction layer processing enabled during the bus configuration process that occurs after each bus reset. And an IRM must have a General ROM that is appropriately configured.

For a device to be capable of being an IRM, additional circuitry, additional processing time and additional power are required. While meeting these requirements may not be a substantial increment for top of the line devices, these requirements can add significant cost, performance degradation, or both to, for example, an mass market DV camcorder. Also, having IRM functionality on the bus may be absolutely essential for a top of the line device to perform as the consumer expects, but it should not be essential for a simple bus consisting of, for example, a couple of DV camcorders and a couple of display/recording devices.

Figure 2:
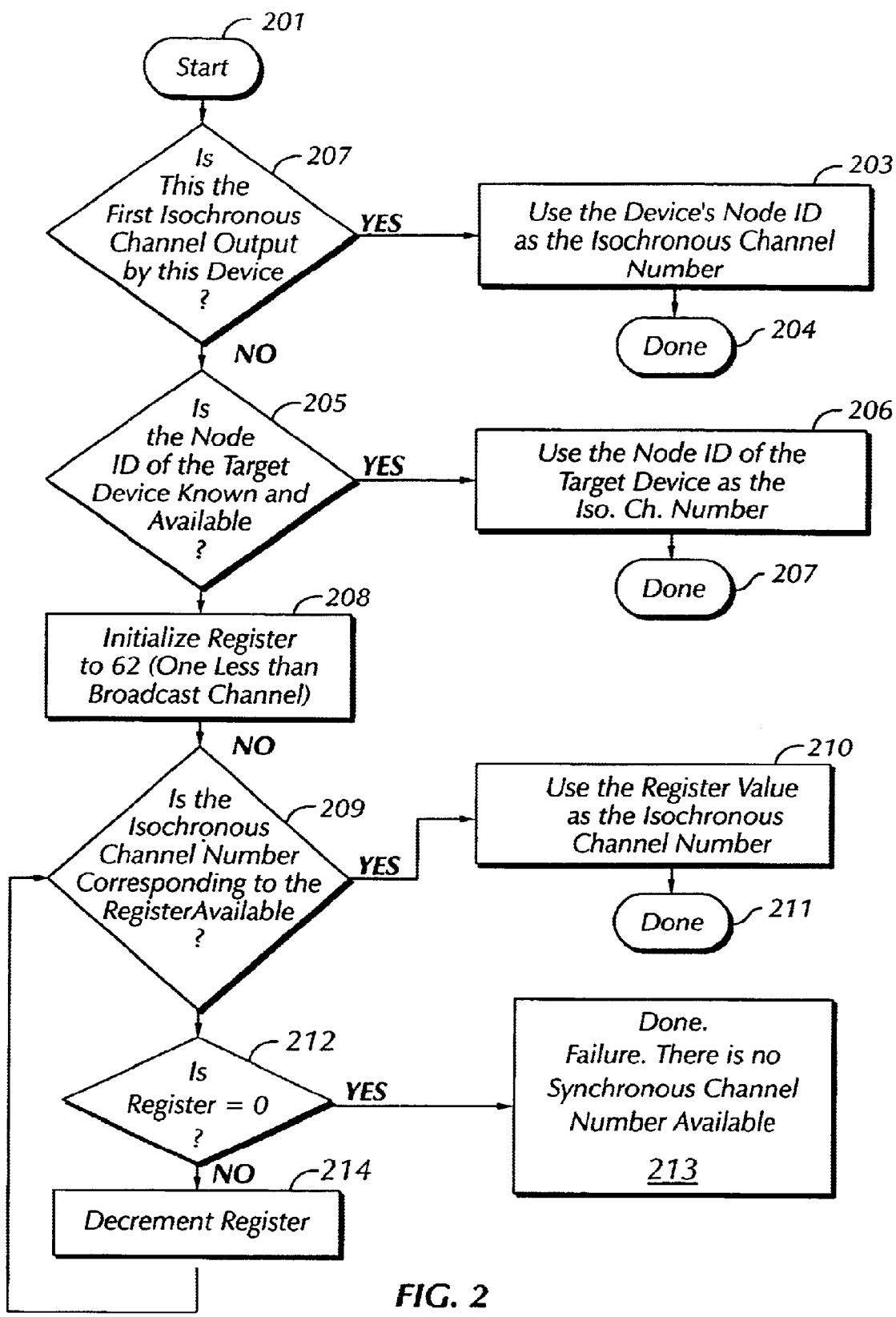
FIG. 2 shows the events involved in selecting an isochronous channel number according to an embodiment of this invention.

FIG. 2 shows a set of events that can be used to select an isochronous channel number according to one embodiment of the invention. This figure can be interpreted as a flow chart that a programmed processor can follow in executing the events shown as sequential steps. This figure can also be interpreted as a state machine diagram that hardware can implement; for some applications, a hardware embodiment may be appropriate because of the higher speed at which such an embodiment can operate. The process shown in this figure can also be broken up into multiple state machines that operate in parallel, the order of the tests can be rearranged, or any of the tests can be omitted.

When a device wishes to initiate transmission on a bus of an isochronous data stream, then the channel selection process starts at event 201. Event 202 determines whether or not the stream to be initiated is the first one being output by this device.

If so, event 203 occurs in which the device's identifier (ID) on the isochronous bus is selected as the isochronous channel number to use. Alternatively, any correspondence or one-to-one mapping between node ID and isochronous channel number can be used, although it may be simpler and less confusing to simply make the isochronous channel number be equal to the node ID. Then the operation of this invention terminates in event 204.

Some embodiments of the invention use as the device's identifier the physical identifier of the node identifier of the device within an IEEE-1394, IEEE-1394a or IEEE-1394.B bus. In such systems, asynchronous packets are addressed to a device using a 16 bit node identifier, which comprises a 10 bit bus identifier and a 6 bit physical identifier. The physical identifier uniquely identifies the device among those on the same bus, with the values 0 to 62 being available for devices and the value 63 being reserved for broadcast asynchronous packets that are addressed to all devices on the bus.

This range of 0 to 62 corresponds to the range of isochronous channel numbers within such buses. The isochronous channel number is encoded in a 6 bit field within each isochronous packet, with 0 to 62 being available for regular isochronous channels and the value 63 being reserved for a broadcast isochronous channel addressed to all devices on the bus.

In some embodiments, the invention can test the availability of this channel number prior to using it, i.e. between events 202 and 203. This can be done in several ways, including but not limited to listening for isochronous packets on that channel number for a few isochronous cycles, or checking with the isochronous resource manager (if one is available on the bus) for the availability of that channel.

Some embodiments rely on the convention that each device on the bus is entitled to one isochronous channel, i.e. the one with the channel number equal to its node ID. If all the devices on the bus follow this convention, then the steps of listening for use of that channel, checking with the isochronous resource manager (if any) for the availability of that channel, or the like are not needed for the case of a device that outputs a single isochronous data stream.

If the device is already outputting an isochronous data stream, then secondary criteria must be used to select a suitable channel number. Various embodiments of the invention use various secondary criteria. In the embodiment shown in FIG. 2, event 205 occurs next, in which it is determined if the node ID of the device which is the target or destination of the isochronous stream being initiated is known to the source device and if the corresponding isochronous channel is available. If so, event 206 occurs in which that node ID is selected as the isochronous channel number. If not, then in the embodiment shown in FIG. 2 event 208 occurs next. Other embodiments could omit event 205 and go directly to testing candidate channel numbers.

Events 208 through 214 form a loop, in which sequential candidate isochronous channel numbers, which are held in a register in some embodiments of the invention, are tested to see if they are available. Preferably, the broadcast channel is not used, thus it need not be checked for availability.

Some embodiments of the invention check candidate isochronous channel numbers in a decreasing sequence, starting with the highest numbered non-broadcast channel. This is because the physical IDs used in a IEEE-1394, IEEE-1394a or IEEE-1394.B bus are assigned during the bus reset and configuration process in a continuous sequence starting with a physical ID of zero. In a bus with N devices attached, the first N isochronous channel numbers are best reserved for use by the corresponding devices. Thus, in some embodiments of the invention the testing decrements, starting with one less than the broadcast channel number, which in the case of an IEEE-1394 bus, is 62 (decimal).

In the situation where there is an isochronous resource manager (IRM) available on the bus, some embodiments of the invention comply with the specified procedures for allocating an isochronous channel number. That is, after using the procedure of this invention to select which isochronous channel number to use, the device check the availability of this channel by reading the CHANNELS_AVAILABLE register from the IRM, and reserves that channel number by updating that register via a lock transaction. This procedure is specified in clause 8.4.3.2 of the IEEE standard 1394-1995.

Simple configurations of isochronous buses may not have an isochronous resource manager available, including but not limited to one or more DV camcorder devices connected to one or more audio/video recording devices. Embodiments of the invention can be advantageous in those situations. Further, embodiments of the invention can be advantageous when the device involved only supports outputting one isochronous data stream at a time. This limitation is significant, but it is often the case for the types of devices most likely to be attached to a simple isochronous bus, including but not limited to camcorders and audio/video recording devices.

Upon a bus reset (which occurs for example when a new device is added to the bus, or when a device is removed), some embodiments of the invention use the same isochronous channel number that the particular isochronous stream had prior to the bus reset. This is in accordance with the IEEE-1394 family of bus specifications. If the device ID of the device that is the source of the stream changed during the bus reset and reconfiguration process, then such an isochronous stream may no longer have the channel number that corresponds to the source device ID. However, this situation is temporary because isochronous streams ordinarily last only while a particular program or entertainment is active (which is typically a few hours or less). After that particular stream ends, then the streams on the bus will follow the convention.

Figure 3:
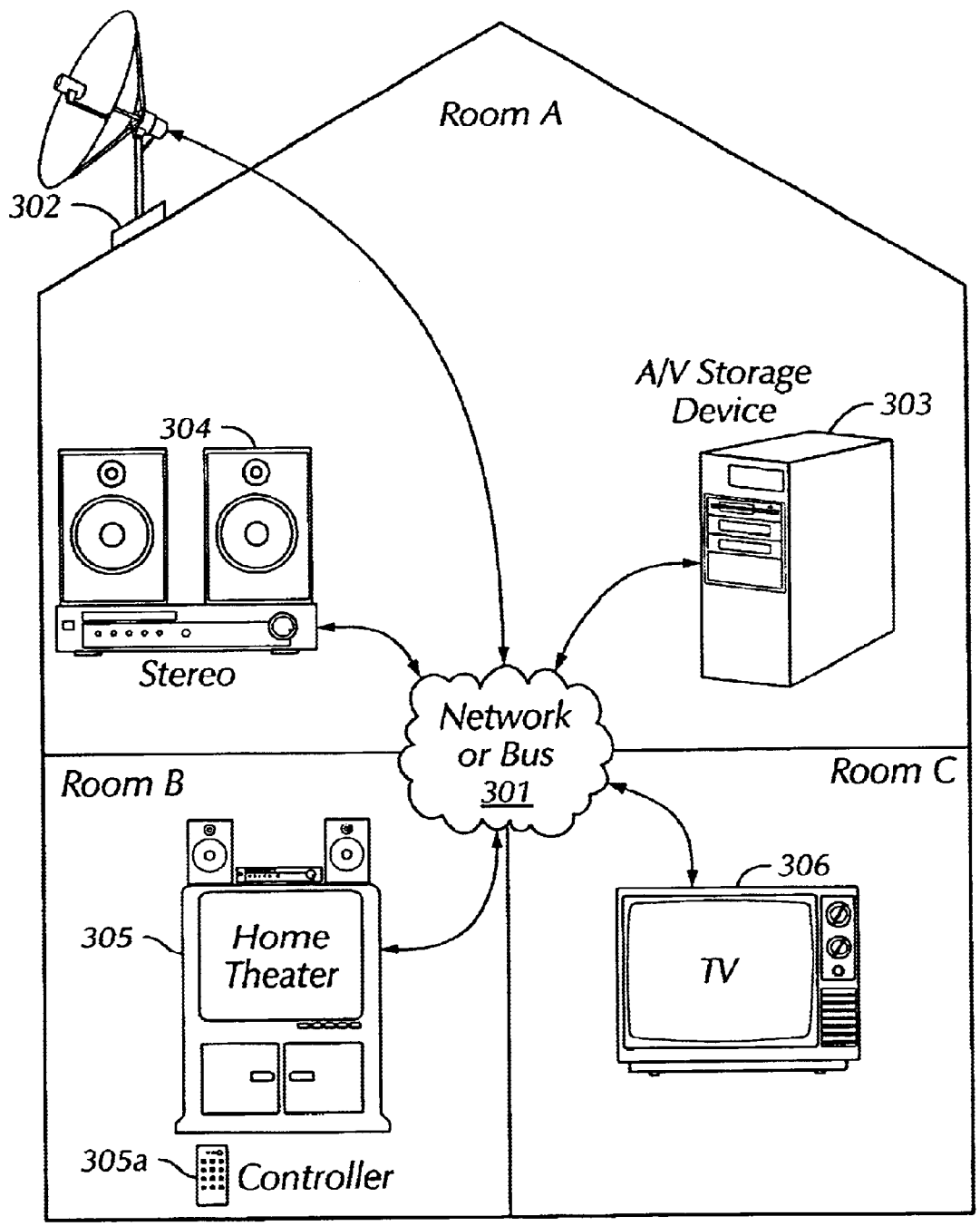
FIG. 3 shows a typical home network, in which an embodiment of this invention can be advantageously used.

FIG. 3 shows how a home or office audio/video network can be configured according to one embodiment of the invention. FIG. 3 is simply one example—networks according to the invention could be larger or smaller and could have different types of devices than are shown.

Network bus or coupling 301 is capable of conveying at least one, and preferably many, audio/video streams from source devices to output, display or performance devices. Network 301 could include, but is not limited to: an IEEE-1394bus, IEEE-1394a bus, IEEE-1394.B bus, a set of such buses, an Ethernet, a local area network, a wide area network, and audio/video cables. Network 301 could include switch boxes, routers and bridges among various types of networks and connections.

The output, display or performance devices as shown are audio output device 304, located in room "A", audio/video output device 305 and its associated user input device 305a, located in room "B", and video output device 306, located in room "C". Audio output device 304 could include, but is not limited to: a stereo amplifier and speakers or a set of wireless headphones.

Audio/video output device 305 and user input device 305a could include, but are not limited to: a television set with an infrared keyboard (such as can be used for Internet access) or a home theater (perhaps with a pair of game joysticks). Video output device 306 could include, but is not limited to: a television screen or a flat panel display that is typically used to show family messages or favorite photographs from the digital family photo album.

The playback, decoder, receiver or other source devices as shown are audio/video source device 303, which includes but is not limited to a laser disk jukebox or an audio/video hard disk drive and audio/video source device 302, which includes but is not limited to a satellite receiver. Alternative source devices are an interactive audio/video device, which includes but is not limited to a personal computer or a game device, a messaging server which includes but is not limited to a personal computer or a telephone answering machine, a video-on-demand server, or an audio source device, which includes but is not limited to a CD player or broadcast radio receiver.

Any devices or interfaces to broadcast, cable or networked services can be used as source devices for various content items available via the user interface of the invention, provided that the source device is capable of providing the service or content item that the user requests.

User display device 305 or 306 is any device that can be used to show to the user a graphical view of the system. User input device 305a is usually associated with user display device 305 or 306 and can be anything that allows the user to select from among the options listed by user display device 305 or 306. User display device 305 or 306 and user input device 305a form a user interface by means of which the user can monitor and control the operation of the network.

As illustrated herein, the invention provides a novel and advantageous method and apparatus for allocating isochronous channel numbers to devices on an isochronous bus. One skilled in the art will recognize various alternative embodiments, design alternatives and changes in form and detail, which may be employed while practicing the invention without departing from its principles, spirit or scope.

In particular the sequence of steps shown in FIG. 2, may be simplified, augmented or changed in various embodiments of the invention. For example, in devices including but not limited to a camcorder, only one isochronous stream can be output at a time. Thus the test in step 202 is unnecessary as well as steps 205 thru 214. In embodiments where it is unnecessary to use any secondary criteria, the apparatus and method according to this invention becomes even simpler.

The invention includes any variation within the meaning of, or equivalent to, any of the following claims.

What is claimed is:

1. A method of selecting an isochronous channel number to be used in transferring an isochronous data stream over a bus from a source device to a destination device, the method comprising:
   obtaining a device identifier of a source device, wherein the device identifier uniquely identifies each device among devices on a bus;
   determining if the source device is currently outputting another isochronous stream over the bus;
   if not, selecting an isochronous channel number that corresponds to the source device identifier; and
   if so, using a secondary criterion to select the isochronous channel number.

2. The method of claim 1 wherein the secondary criterion comprises:
   obtaining the device identifier of a destination device, to which the isochronous data stream is addressed;
   determining if an isochronous channel number that corresponds to the destination device identifier is currently in use; and
   if not, selecting the corresponding isochronous channel number.

3. The method of claim 2 wherein the determining comprises listening on the bus for isochronous transmissions that use the corresponding isochronous channel number.

4. The method of claim 1 wherein the secondary criterion comprises:
   initializing a potential channel number;
   determining if the potential channel number is currently in use for isochronous data transfer;
   if not, selecting the potential isochronous channel number as the isochronous channel number; and
   if so, sequencing the potential channel number and repeating as needed the determining and the sequencing.

5. The method of claim 4 wherein the determining comprises listening on the bus for isochronous transmissions that use the potential channel number.

6. The method of claim 4 wherein the initializing sets the potential channel number to a largest isochronous channel number that is not a broadcast channel number and the sequencing decrements the potential channel number.

7. The method of claim 1 wherein the bus is selected from an IEEE-1394-1995 bus, an IEEE-1394a bus, and an IEEE-1394.B bus.

8. The method of claim 1 wherein the bus does not have an isochronous resource manager.

9. A source device that transmits an isochronous data stream over a bus to a destination device, comprising:
   a memory circuit configured to hold a source device identifier, wherein the source device identifier uniquely identifies the source device among devices on a bus; and
   control logic configured to select an isochronous channel number for transmitting the isochronous data stream over the bus by determining if the source device is currently outputting another isochronous stream over the bus, and if not selecting an isochronous channel number that corresponds to the source device identifier, and if so using a secondary criterion to select the isochronous channel number.

10. The source device of claim 9 wherein the control logic is further configured to obtain the device identifier of a destination device, to which the isochronous data stream is addressed, to determine if an isochronous channel number that corresponds to the destination device identifier is currently in use, and if not to select the corresponding isochronous channel number.

11. The source device of claim 9 wherein the control logic further comprises:
   monitoring circuitry configured to monitor the bus for isochronous transmissions that use the corresponding isochronous channel number.

12. The source device of claim 9 further comprising:
   a potential channel number register;
   wherein the control logic is further configured to determine if the isochronous channel corresponding to the potential channel number register is currently in use for isochronous data transfer, and if not to select the potential isochronous channel number as the isochronous channel number, and if so to sequence the potential channel number and to repeat as needed the determining and the decrementing.

13. The source device of claim 9 wherein the potential channel number register is configured to initialize to a largest isochronous channel number that is not a broadcast channel number and the sequencing of the potential channel number comprises decrementing it.

14. The source device of claim 9 wherein the control logic further comprises:
   monitoring circuitry configured to monitor the bus for isochronous transmissions that use the corresponding isochronous channel number.

15. The source device of claim 9 wherein the bus is selected from an IEEE-1394-1995 bus, an IEEE-1394a bus, and an IEEE-1394.B bus.

16. The source device of claim 9 wherein the bus does not have an isochronous resource manager.

17. A source device for transmitting an isochronous data stream over a bus to a destination device, comprising:
   a memory means for holding a source device identifier, wherein the source device identifier uniquely identifies the source device among devices on a bus;
   a control means for selecting an isochronous channel number for transmitting the isochronous data stream over the bus by determining if the source device is currently outputting another isochronous stream over the bus, and if not selecting an isochronous channel number that corresponds to the source device identifier, and if so using a secondary criterion to select the isochronous channel number.

18. The source device of claim 17 wherein the control means is further a means for obtaining the device identifier of a destination device, to which the isochronous data stream is addressed, for determining if an isochronous channel number that corresponds to the destination device identifier is currently in use, and if not for selecting the corresponding isochronous channel number.

19. The source device of claim 17 wherein the control means is further means for monitoring the bus for isochronous transmissions that use the corresponding isochronous channel number.

20. The source device of claim 17 further comprising:
   a potential channel number means for initializing itself to a largest isochronous channel number that is not a broadcast channel number;
   wherein the control means is further a means for determining if the isochronous channel corresponding to the potential channel number register is currently in use for isochronous data transfer, and if not for selecting the potential isochronous channel number as the isochronous channel number, and if so for sequencing the potential channel number register means and for repeating as needed the determining and the decrementing.

21. The source device of claim 17 wherein the potential channel number means is also a means for initializing itself to a largest isochronous channel number that is not a broadcast channel number and the sequencing comprises decrementing.

22. The source device of claim 17 wherein the control means further comprises: monitoring means for monitoring the bus for isochronous transmissions that use the corresponding isochronous channel number.

23. The source device of claim 17 wherein the bus is selected from an IEEE-1394-1995 bus, an IEEE-1394a bus, and an IEEE-1394.B bus.

24. The source device of claim 17 wherein the bus does not have an isochronous resource manager.

* * * * *